United States Patent
Kim et al.

(10) Patent No.: US 8,787,235 B2
(45) Date of Patent: Jul. 22, 2014

(54) METHOD AND APPARATUS FOR TRANSMITTING DATA IN A WIRELESS COMMUNICATION SYSTEM

(75) Inventors: Dong Cheol Kim, Anyang-si (KR); Min Seok Noh, Anyang-si (KR); Jin Sam Kwak, Anyang-si (KR); Seung Hee Han, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 724 days.

(21) Appl. No.: 13/063,068

(22) PCT Filed: Oct. 14, 2009

(86) PCT No.: PCT/KR2009/005909
§ 371 (c)(1),
(2), (4) Date: Mar. 9, 2011

(87) PCT Pub. No.: WO2010/044605
PCT Pub. Date: Apr. 22, 2010

(65) Prior Publication Data
US 2011/0164548 A1    Jul. 7, 2011

Related U.S. Application Data

(60) Provisional application No. 61/105,799, filed on Oct. 15, 2008.

(51) Int. Cl.
*H04H 20/71*    (2008.01)
*H04W 16/32*    (2009.01)
*H04W 4/06*    (2009.01)

(52) U.S. Cl.
CPC ............... *H04W 16/32* (2013.01); *H04W 4/06* (2013.01)
USPC ........... 370/312; 370/310; 370/208; 455/403; 455/422.1

(58) Field of Classification Search
USPC ............... 370/310, 312, 208; 455/403, 422.1, 455/435.2, 435.3, 432.3, 443–446, 448, 455/449, 436, 438, 439, 440
See application file for complete search history.

(56) References Cited

U.S. PATENT DOCUMENTS

| | | | |
|---|---|---|---|
| 7,075,968 B1 * | 7/2006 | Ghassemzadeh et al. | 375/130 |
| 2003/0194992 A1 | 10/2003 | Kim et al. | |
| 2006/0056347 A1 | 3/2006 | Kwak et al. | |
| 2008/0025240 A1 * | 1/2008 | Casaccia et al. | 370/312 |
| 2009/0073909 A1 * | 3/2009 | Cai et al. | 370/312 |

FOREIGN PATENT DOCUMENTS

| | | |
|---|---|---|
| KR | 10-2003-0080946 A | 10/2003 |
| KR | 10-2006-0024756 A | 3/2006 |

* cited by examiner

*Primary Examiner* — Un C Cho
*Assistant Examiner* — Siming Liu
(74) *Attorney, Agent, or Firm* — Birch, Stewart, Koalsch & Birch, LLP

(57) ABSTRACT

A data transmission method and apparatus in a wireless communication system is provided. The data transmission method include dividing a multicast broadcast single frequency network (MBSFN) zone including a plurality of cells into at least one sub-zone including at least one cell, enabling a plurality of cells belonging to the MBSFN zone to transmit first multicast broadcast service (MBS) data, and enabling the cell belonging to the at least one sub-zone to transmit sub-zone data superposed with the first MBS data, wherein the sub-zone data is second MBS data.

2 Claims, 18 Drawing Sheets

METHOD AND APPARATUS FOR TRANSMITTING DATA IN A WIRELESS COMMUNICATION SYSTEM

CROSS-REFERENCE TO RELATED APPLICATIONS

This application is the National Phase of PCT/KR2009/005909 filed on Oct. 14, 2009, which claims the benefit under 35 U.S.C. 119(e) to of of U.S. Provisional application No. 61/105,799 filed on Oct. 15, 2008, all of which are incorporated by reference in their entirety herein.

BACKGROUND OF THE INVENTION

1. Field of the Invention

The present invention relates to wireless communications, and more particularly, to a method and apparatus for transmitting multicast broadcast service (MB S) data in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4$^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference. In a system using the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner.

An electrical and electronics engineers (IEEE) 802.16 wireless communication system provides a high-speed multimedia communication service to users in addition to the conventional voice and packet data communication services. The multimedia communication service is a service for transmitting data packets to a plurality of user equipments (UEs), and is referred to as various terms such as a broadcast/multicast service, a multimedia broadcast multicast service (MBMS), a multimedia and broadcast service (MBS), and a point-to-multipoint service. These terms are used without distinction in the following description. The MBS is based on Internet protocol (IP) multicast and allows UEs to receive the same multimedia data by sharing resources required for data packet transmission. Therefore, resource efficiency can be increased by the MBS.

The MBS can be classified into two types. The first type is a single-BS access type in which a service is provided by one BS in one cell. Examples of the first type include mobile TV, emergency alert, home network, corporate announcement, etc. The second type is a multi-BS access type in which several BSs provide an MBS service by creating one MBS zone. That is, the MBS service is provided in such a manner that the same burst is allocated from an MBS server in a plurality of cells in the same NIBS zone by using one NIBS zone identifier (ID). Therefore, service continuity and a macro-diversity gain can be obtained without a handover in case of inter-cell movement of cells including the BS.

Meanwhile, a cell in the MBS zone transmits unicast data in addition to MBS data. The unicast data is cell-specific data whose content varies from one cell to another. When the MBS data and the unicast data need to be transmitted simultaneously in one cell, the MBS data and the unicast data can be transmitted in a superposed manner. In general, the MBS service is provided by applying one fixed modulation and coding scheme (MCS) level in the MBS zone. As a result, overall performance is standardized downward in the MBS zone, which may deteriorate quality of the NIBS service.

Accordingly, there is a need for a method capable of effectively providing an MBS service.

SUMMARY OF THE INVENTION

The present invention provides a method and apparatus for transmitting multicast broadcast service (MBS) data in a wireless communication system.

In an aspect, a data transmission method in a wireless communication system is provided. The data transmission method include dividing a multicast broadcast single frequency network (MBSFN) zone including a plurality of cells into at least one sub-zone including at least one cell, enabling a plurality of cells belonging to the MBSFN zone to transmit first multicast broadcast service (MBS) data, and enabling the cell belonging to the at least one sub-zone to transmit sub-zone data superposed with the first MBS data, wherein the sub-zone data is second MBS data. The second MBS data may be retransmission data of the first MBS data. The first MBS data and the second MBS data may be transmitted by multiplying different code sets. The at least one sub-zone may include an edge cell of the MBSFN zone.

Meanwhile, when the at least one sub-zone belongs to both the MBSFN zone and an adjacent MBSFN zone, the second MBS data may be MBS data of the adjacent MBSFN zone. The first MBS data transmitted in the MBSFN zone by the cell belonging to both the MBSFN zone and the adjacent MBSFN zone and the second MBS data in the adjacent MBSFN zone may be transmitted by multiplying an identification code set. The first MBS data transmitted in the MBSFN zone by the cell belonging to both the MBSFN zone and the adjacent MBSFN zone and the second MBS data in the adjacent MBSFN zone may be transmitted while having different pilot structures.

According to the present invention, different services can be additionally provided for some cells among a plurality of cells belonging to a multicast broadcast single frequency network (MBSFN) zone, and performance improvement can be obtained in a cell located in an edge of the MBSFN zone.

DESCRIPTION OF EXEMPLARY EMBODIMENTS

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16m.

Figure 1:
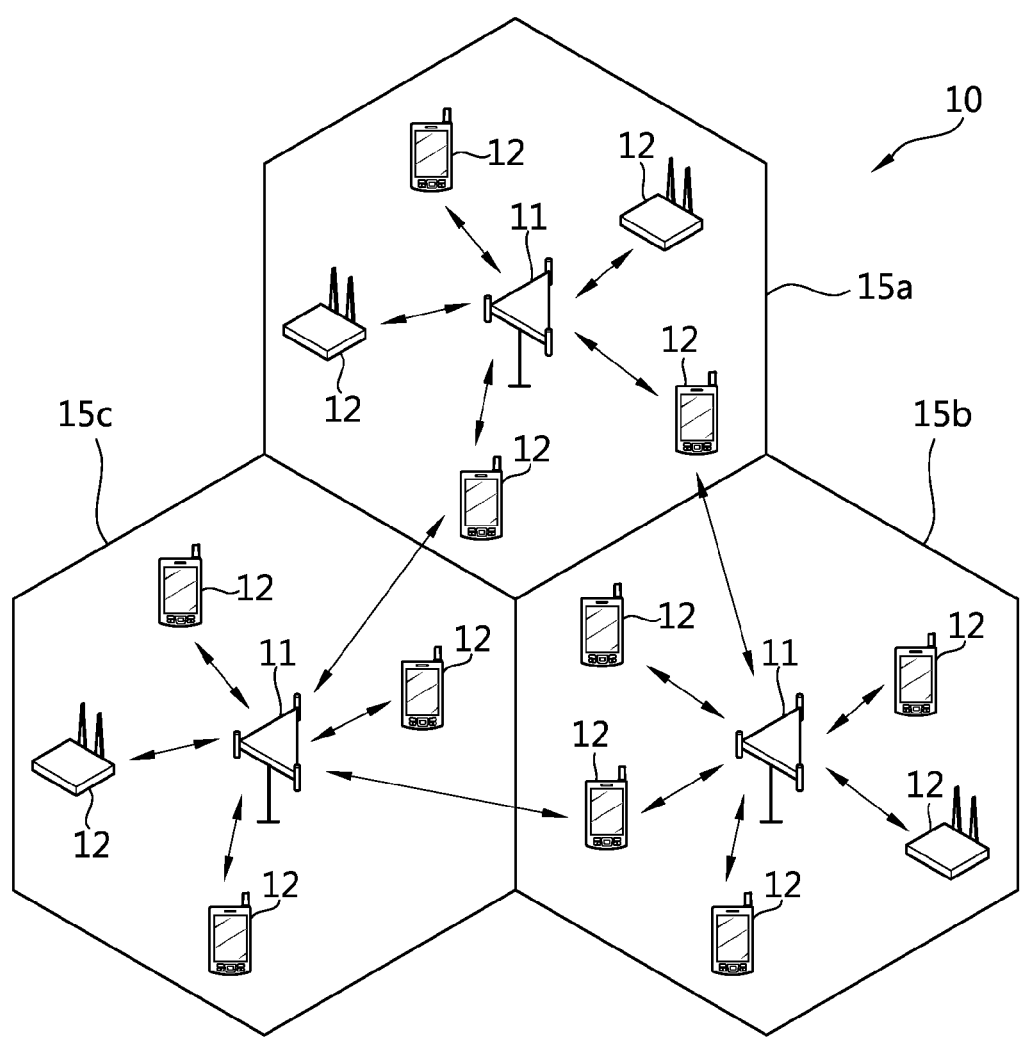
FIG. 1 shows a wireless communication system.

FIG. 1 shows a wireless communication system. A wireless communication system 10 includes at least one base station (BS) 11. Respective BSs 11 provide communication services to specific geographical regions (generally referred to as cells) 15a, 15b, and 15c. Although one BS can provide a communication service to one or more cells, it is assumed hereinafter that one BS provides the communication service to one cell. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. The BS 11 is generally a fixed station that communicates with the UE 12 and may be referred to as another terminology, such as an evolved node-B (eNB), a base transceiver system (BTS), an access point, an access network (AN), etc.

A UE belongs to one cell. A cell to which the UE belongs is referred to as a serving cell. A BS providing a communication service to the serving cell is referred to as a serving BS. Since a wireless communication system is a cellular system, there is another cell adjacent to the serving cell. The cell adjacent to the serving cell is referred to as a neighbor cell. A BS providing a communication service to the neighbor cell is referred to as a neighbor BS. The serving cell and the neighbor cell are determined relatively with respect to the UE.

This technique can be used for a downlink or an uplink. In general, the downlink denotes communication from the BS 11 to the UE 12, and the uplink denotes communication from the UE 12 to the BS 11. In the downlink, a transmitter may be a part of the BS 11, and a receiver may be a part of the UE 12. In the uplink, the transmitter may be a part of the UE 12, and the receiver may be a part of the BS 11.

Figure 2:
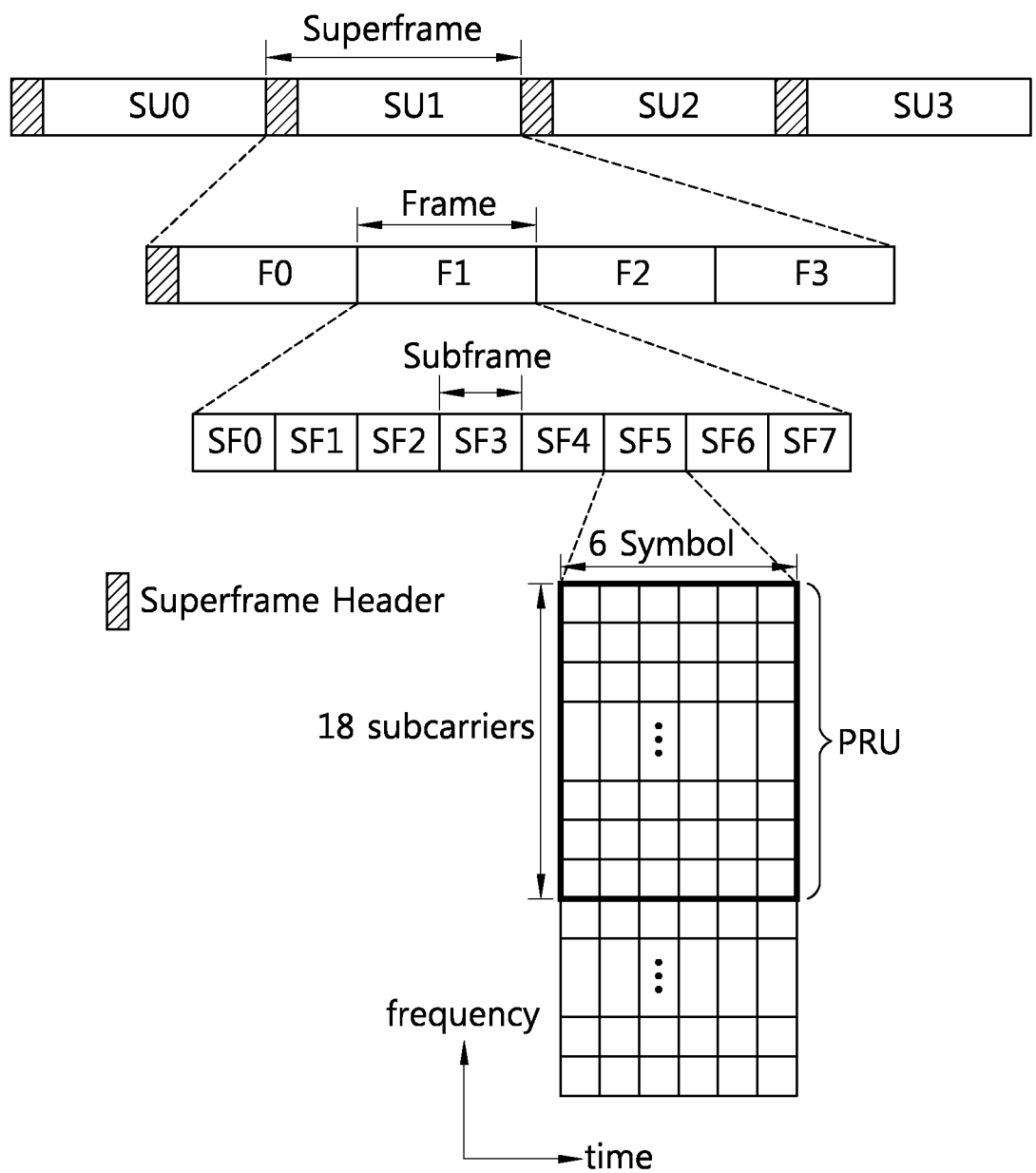
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. For example, the SF may have a size of 20 milliseconds (ms), and each frame may have a size of 5 ms. A length of the SF, the number of frames included in the SF, the number of subframes included in the frame, etc., may change variously. The number of SFs included in the frame may change variously according to a channel bandwidth and a cyclic prefix (CP) length.

The SFH may carry an essential system parameter and system configuration information. The SFH may be located in a first subframe of the SF. The SFH may be classified into a primary-SFH (P-SFH) and a secondary-SFH (S-SFH). The P-SFH and the S-SFH may be transmitted in every SF.

One frame includes a plurality of subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol represents one symbol period, and can be referred to as other terminologies such as an OFDMA symbol, an SC-FDMA symbol, etc., according to a multiple access scheme. Although it is described herein that one subframe includes 5, 6, 7, or 9 OFDM symbols, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission can be simultaneously performed while occupying different frequency bands.

The subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU may be determined according to a subframe type. For example, when one subframe consists of 6 OFDM symbols, the PRU may be defined with 18 subcarriers and 6 OFDM symbols.

The IEEE 802.16m system supports an enhanced multicast broadcast service (E-MBS). The E-MBS is a point-to-multipoint system in which data packets are simultaneously transmitted from one source to a plurality of destinations. Broadcast implies capability for transmitting contents to all users. Multicast implies capability for transmitting contents to a specific group of users registered to receive a specific service. Static multicast and dynamic multicast can be supported.

E-MBS contents are transmitted in an E-MBS zone. The E-MBS zone is a set of at least one advanced base station (ABS) that transmits the same E-MBS contents. The E-MBS contents are identified by the same identifier (ID). Each ABS capable of providing the E-MBS service may belong to one or more E-MBS zones, and when the ABSs belong to different E-MBS zones, different services can be provided respectively. Each E-MBS zone is identified by a unique E-MBS zone ID.

Figure 3:
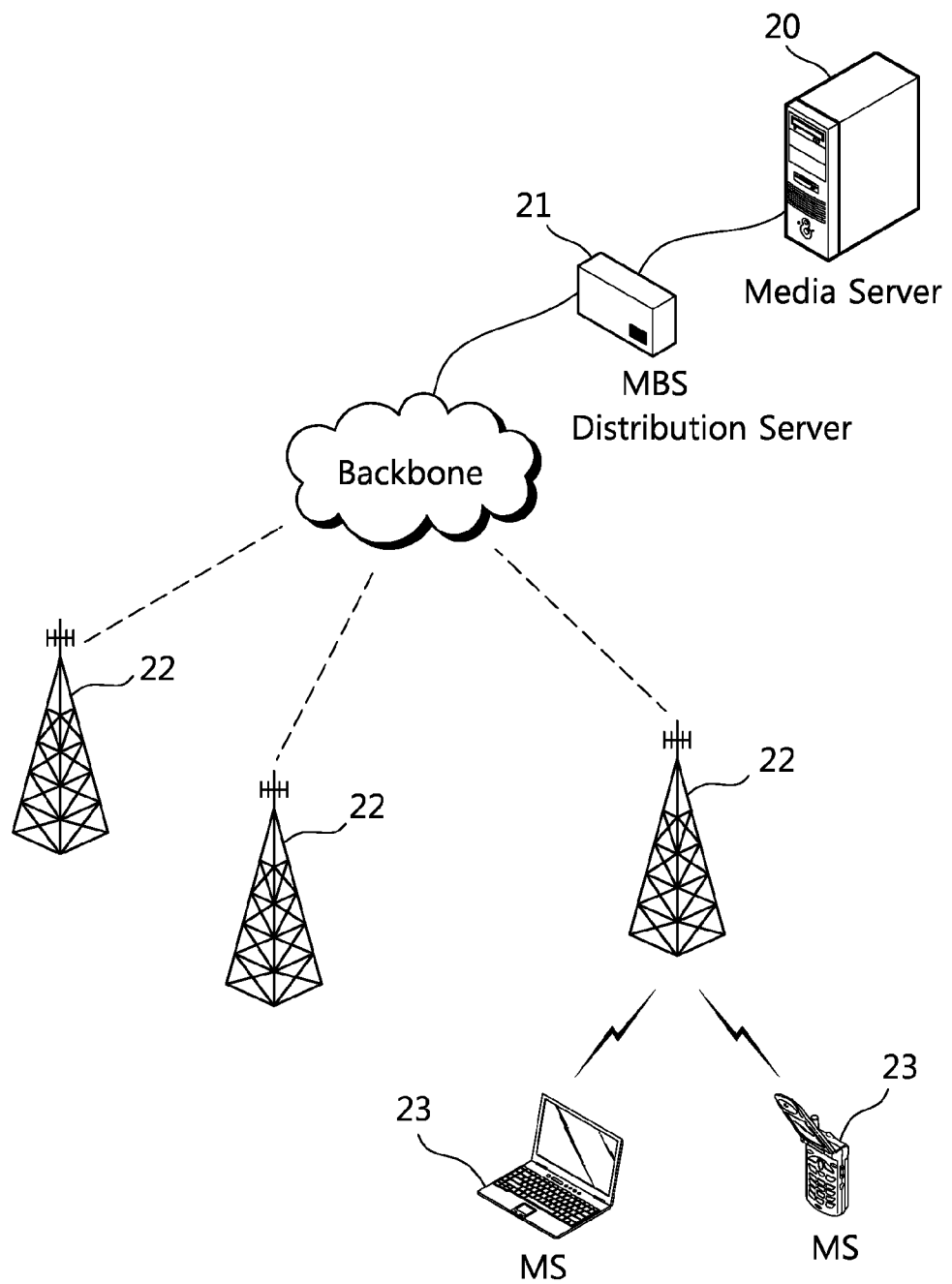
FIG. 3 shows an example of a reference model for an E-MBS of a broadband wireless communication system.

FIG. 3 shows an example of a reference model for an E-MBS of a broadband wireless communication system.

Referring to FIG. 3, an E-MBS network includes an MBS media server 20, an MBS distribution server 21, one or more BSs 22, and one or more MSs 23. The MBS media server 20 provides MBS data to the BSs 22, and performs MS authentication and encryption key distribution with respect to MBS contents. The MBS distribution server 21 takes charge of scheduling of the MBS data delivered to the BSs 22. The BS 22s provide the MBS data delivered through a backbone network to the MSs 23 through a radio interface, and the MSs 23 receive the MBS data from the BSs 22. Optionally, the MBS distribution server 21 may be omitted, and the MBS media server 20 may perform the scheduling of the MBS data. Alternatively, the MBS distribution server 21 may be omitted, and one of the BSs 22 may perform the scheduling of the MBS data.

The MBS of the broadband wireless communication system may have the following characteristics.

1) Minimization of power consumption: The MS can minimize power consumption while receiving the MBS data irrespective of a current operation mode (e.g., a normal operation mode, a sleep mode, and an idle mode).

2) Mobility: The MS can be provided with a seamless MBS connection even if the MS moves between the BSs.

3) MBS zone: The MBS contents are transmitted using an MBS zone divided regionally, and MBS configuration information (e.g., an MBS connection ID, an encryption key, a service ID, etc.) can be configured differently between different MBS zones.

4) Security: The MBS contents are delivered only to authorized users. The encryption key for a MAC PDU of MBS data can be equally applied between the BSs in the MBS zone.

Hereinafter, the MBS zone will be described.

MBS related parameters (e.g., a security key, a multicast connection ID, etc.) may be configured differently according to a region, and the MBS contents may be broadcast only in a limited zone. Therefore, when the MS moves to another BS or performs a handover while receiving the MBS contents, the MS has to determine whether the stored MBS information is valid and whether the MBS contents can be persistently received.

If the BS provides the MBS by using a parameter different from the MBS information stored in the MS or does not transmit the MBS contents, the MS has to access to a new BS in order to update the parameter for the MBS contents. To solve this problem, the broadband wireless communication system manages the MBS zone in which one or more BSs providing the MBS are grouped.

The BSs in the same MBS zone transmit the MBS contents to the MSs by using the same MBS parameter. In addition, the BS delivers an MBS zone ID to the MS so that the MS can recognize the MBS zone. The MS can immediately determine whether the currently stored MBS parameter is valid by using the MBS zone ID received from the BS.

Further, if the MS moves to another BS in the same MBS zone, there is no need to perform a process of reconfiguring the MBS related parameter to receive the MBS data. Furthermore, the BSs in the same MBS zone transmit the MBS data at the same time by using the same radio resource, and thus MBS data reception efficiency can be increased by using a macro-diversity effect.

Figure 4:
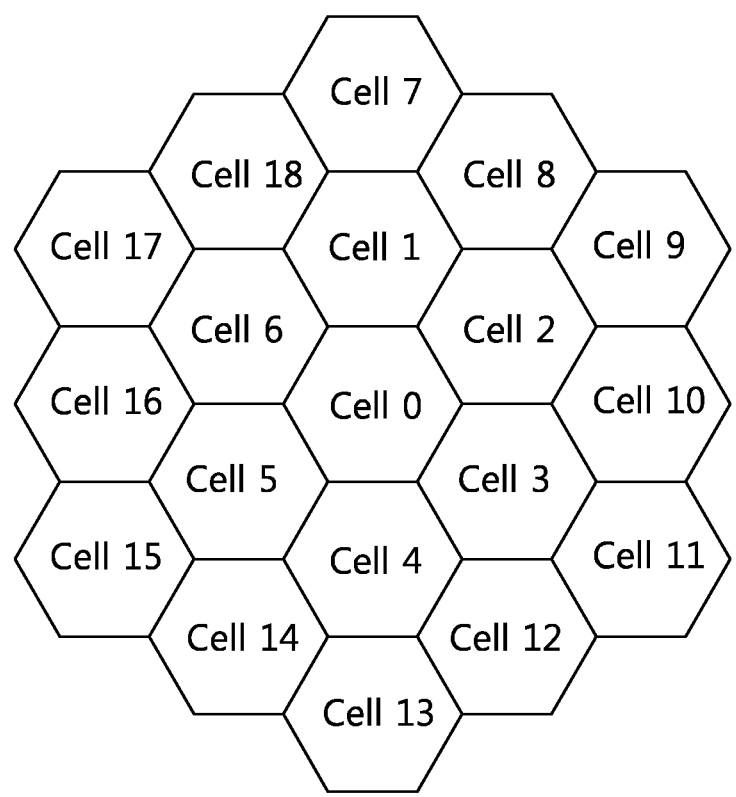
FIG. 4 shows an example of a multicast broadcast single frequency network (MBSFN) zone.

FIG. 4 shows an example of a multicast broadcast single frequency network (MBSFN) zone. The MBSFN may indicate a macro-diversity operation mode.

Referring to FIG. 4, an MBS zone to which a single frequency network (SFN) is applied is shown for example. An operation of the SFN can be performed when a plurality of cells having a timing error in a cyclic prefix (CP) range transmit the same data at the same time by using the same transmission mechanism (e.g., a symbol, a sub-channel, the same frame number, a modulation scheme, etc.). Data transmission between BSs in the MBS zone is synchronized in a symbol level which ensures macro diversity based on signal combination and high cell edge performance.

Meanwhile, the MBSFN zone consists of 19 cells, i.e., cells 0 to 18. However, the present invention is not limited thereto, and thus the number of cells constituting the MBSFN zone may be greater than or less than 19. In addition, the MBSFN zone can be configured in several combinations.

An IEEE 802.16m system supports data multiplexing in a mixed carrier by using a multiplexing scheme such as time division multiplexing (TDM), frequency division multiplexing (FDM), or the like. When MBS data and unicast data are time-division multiplexed, the MBS data and the unicast data are transmitted in different subframes. When the MBS data and the unicast data are frequency-division multiplexed, all PRUs whose basic unit is $N_2$ PRUs are divided into two parts. One part is for the MBS data, and the other part is for the unicast data. After the multiplexing, sub-channelization is independently performed for the MBS data and the unicast data.

Figure 5:
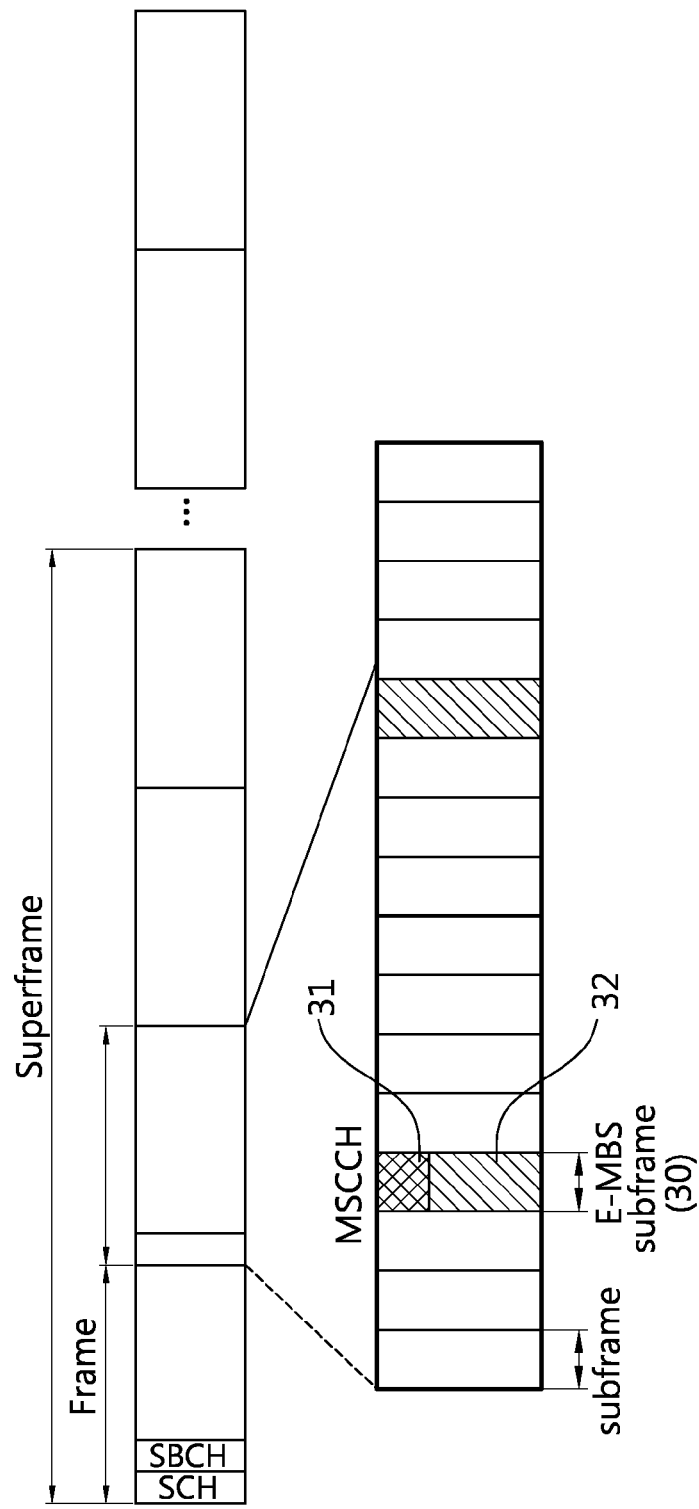
FIG. 5 shows an example of a frame structure when a mixed carrier is used and an E-MBS subframe exists in a superframe.

FIG. 5 shows an example of a frame structure when a mixed carrier is used and an E-MBS subframe exists in a superframe.

Referring to FIG. 5, an E-MBS subframe 30 is allocated at a specific position of a frame constituting the superframe. The E-MBS subframe can be classified into a multicast service control channel (MSCCH) for transmitting multicast control information for an MBS and a data channel for transmitting data. When the mixed carrier is used, the E-MBS uses the same frame structure as a unicast carrier. When the superframe includes an E-MBS subframe, the E-MBS subframe is allocated with a fixed pattern in the superframe. The pattern may change from one superframe to another.

A cell belonging to an MBSFN zone can transmit unicast data in addition to the multicast data. The unicast data is cell-specific data having different contents for each cell. When there is a need to transmit the MBS data and the unicast data simultaneously in one cell, the MBS data and the unicast data may be transmitted in a superposed manner.

Figure 6:
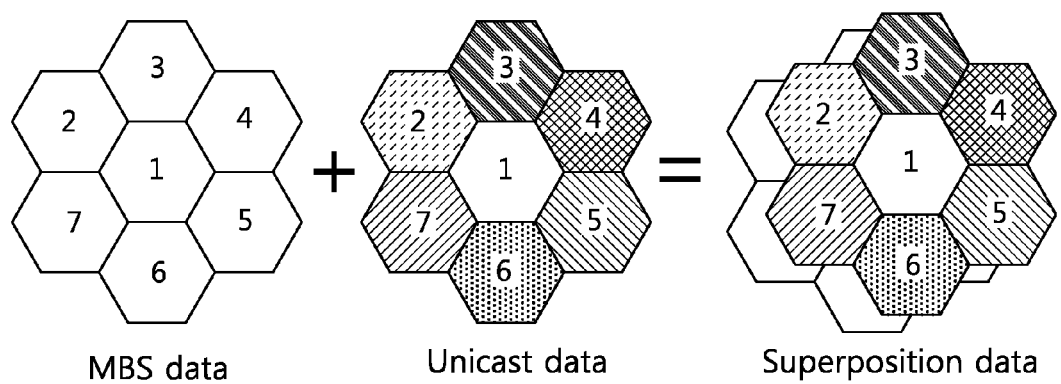
FIG. 6 is a typical case of transmitting MBS data and unicast data in an MBSFN zone in a superposed manner.

FIG. 6 is a typical case of transmitting MBS data and unicast data in an MBSFN zone in a superposed manner. Referring to FIG. 6, the MBSFN zone consists of 7 cells, i.e., cells 1 to 7. The same MBS data is transmitted in the cells 1 to 7. In addition, different unicast data is transmitted in the cells 1 to 7. The MBS data and the unicast data are superposed to create superposition data, and the superposition data is transmitted.

Figure 7:
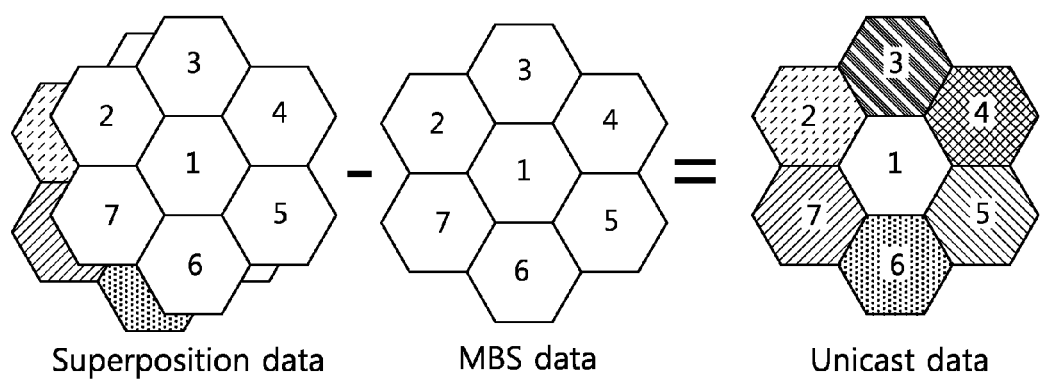
FIG. 7 shows a typical case of restoring received superposition data into MBS data and unicast data in an MBSFN zone.

FIG. 7 shows a typical case of restoring received superposition data into MBS data and unicast data in an MBSFN zone. The received superposition data is restored by decoding the MBS data, and then the MBS data is removed from the superposition data to restore the unicast data.

Figure 8:
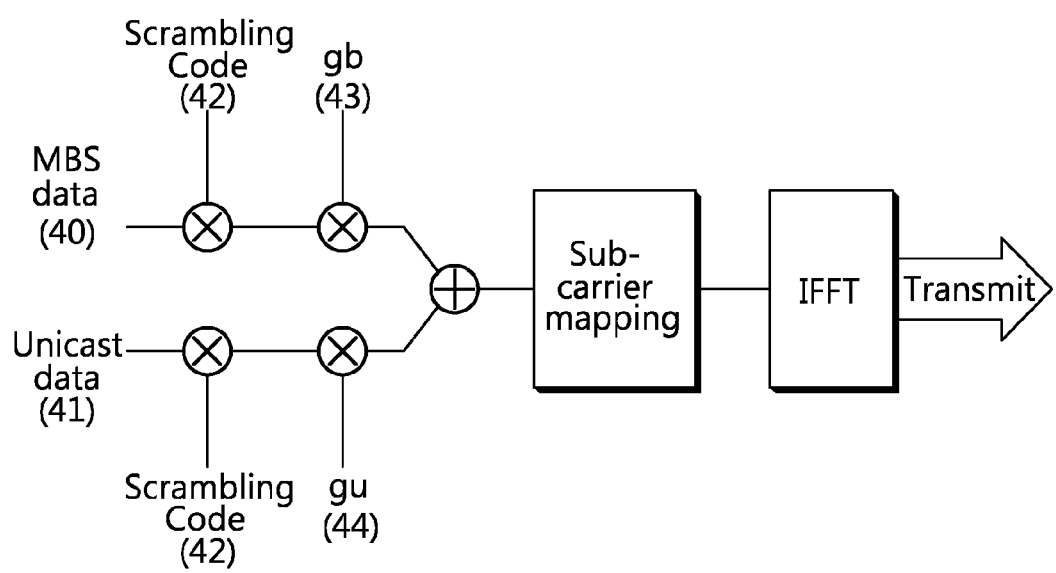
FIG. 8 is a block diagram showing a process of superposing MBS data and unicast data.

FIG. 8 is a block diagram showing a process of superposing MBS data and unicast data. Referring to FIG. 8. MBS data 40 and unicast data 41 are multiplied by different scrambling codes 42, and a power ratio between the MBS data and the unicast data is regulated by a factor defined as a ratio of a gb 43 to a gu 44. The MBS data 40 and the unicast data 41 are superposed to create superposition data. Then, the MBS data 40 and the unicast data 41 are processed with subcarrier mapping 45 in a frequency domain and are transmitted by using inverse fast Fourier transform (IFFT) 46.

Figure 9:
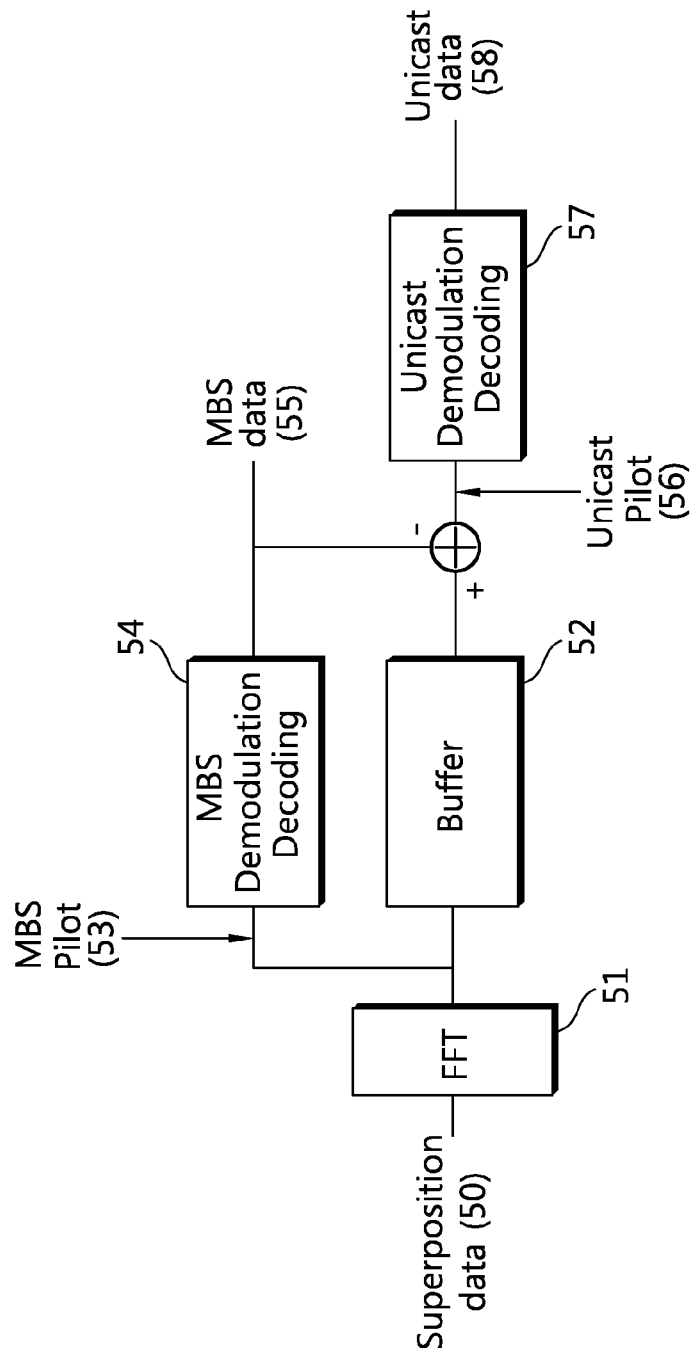
FIG. 9 is a block diagram showing a process of restoring superposition data into MBS data and unicast data.

FIG. 9 is a block diagram showing a process of restoring superposition data into MBS data and unicast data. Referring to FIG. 9, superposition data 50 is stored in a buffer 52 after performing fast Fourier transform (FFT) 51, and MBS data 55 is first restored through MBS demodulation and decoding 54 by using a channel value estimated using an MBS pilot 53. Meanwhile, the MBS data 55 is removed from data stored in the buffer 52, and the unicast data is restored through unicast demodulation and decoding 57 by using a channel value estimated using a unicast pilot 56.

Hereinafter, the proposed MBS data transmission method will be described according to embodiments of the present invention.

In general, an E-MBS service is provided by applying one fixed MCS level in an MBSFN zone. When providing the service with the one fixed MCS level, overall performance is standardized downward in the MBSFN zone, which may deteriorate quality of the service. To solve this problem, a method can be proposed in which a BS in the MBSFN zone adaptively regulates an MCS level on the basis of feedback information received from UEs to improve performance in the MBSFN zone. However, signaling overhead may occur when the UEs transmit the feedback information, and another communication is required between cells in the control of the MCS level. Therefore, there is a need for a method capable of providing different MCS levels or different services to one or some specific BSs while using a fixed MCS level or an MCS level that changes adaptively and periodically in one MBSFN zone.

Figure 10:
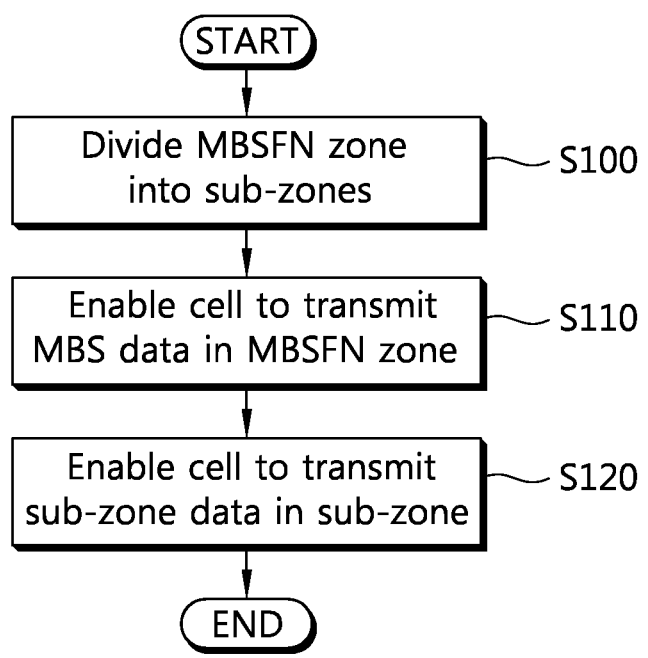
FIG. 10 shows an embodiment of the proposed MBS data transmission method.

FIG. 10 shows an embodiment of the proposed MBS data transmission method.

In step S100, an MBSFN zone including a plurality of cells is divided into at least one sub-zone including at least one cell. The sub-zone represents a unit of BSs to which sub-zone data to be described below is transmitted in the MBSFN zone. The sub-zone may consist of one cell, and may include a plurality of cells. In addition, a plurality of sub-zones may be provided. That is, the sub-zone can be configured in several combinations.

In step S110, a plurality of cells belonging to the MBSFN zone transmit MBS data. The MBS data is data which is equally received by all UEs in the MBSFN zone.

In step S120, a cell belonging to the at least one sub-zone transmits sub-zone data superposed with the MBS data. The MBS data and the sub-zone data are superposed to create superposition data.

The transmitted MBS data can be retransmitted as the sub-zone data, and when a retransmission request message for the transmitted MBS data is received, retransmission data for the MBS data can be transmitted. Accordingly, an MBSFN gain can be obtained. Alternatively, the sub-zone data may be unicast data which is transmitted only in the sub-zone. When the MBS data is transmitted with high quality, the unicast data transmitted as the sub-zone data may be data with high priority according to importance of data.

Figure 11:
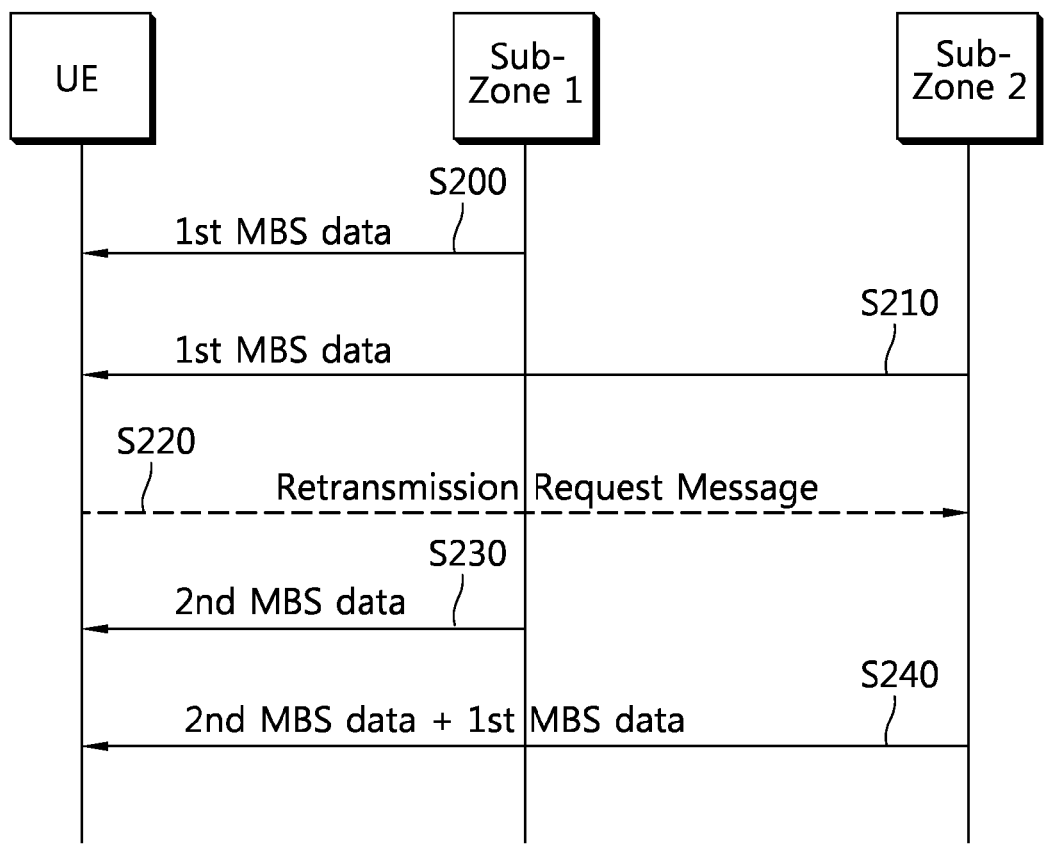
FIG. 11 shows another embodiment of the proposed MBS data transmission method.

FIG. 11 shows another embodiment of the proposed MBS data transmission method.

In step S200, a sub-zone 1 transmits $1^{st}$ MBS data to a UE. In step S210, a sub-zone 2 also transmits $1^{st}$ MBS data to the UE. In step S220, the sub-zone 2 receives a retransmission request message from the UE. The retransmission request message may be any one of an acknowledgement/non-acknowledgment (ACK/NACK), a channel quality indicator (CQI), and a precoding matrix index (PMI). In step S230, the sub-zone 1 transmits $2^{nd}$ MBS data to the UE. In step S240, the sub-zone 2 transmits $2^{nd}$ MBS data and retransmission data of the $1^{st}$ MBS data in response to the retransmission request message as the sub-zone data in a superposition manner. The sub-zone data may be the $1^{st}$ MBS data itself, or may be retransmission data consisting of traffic of the $1^{st}$ MBS data for which NACK is received.

Figure 12:
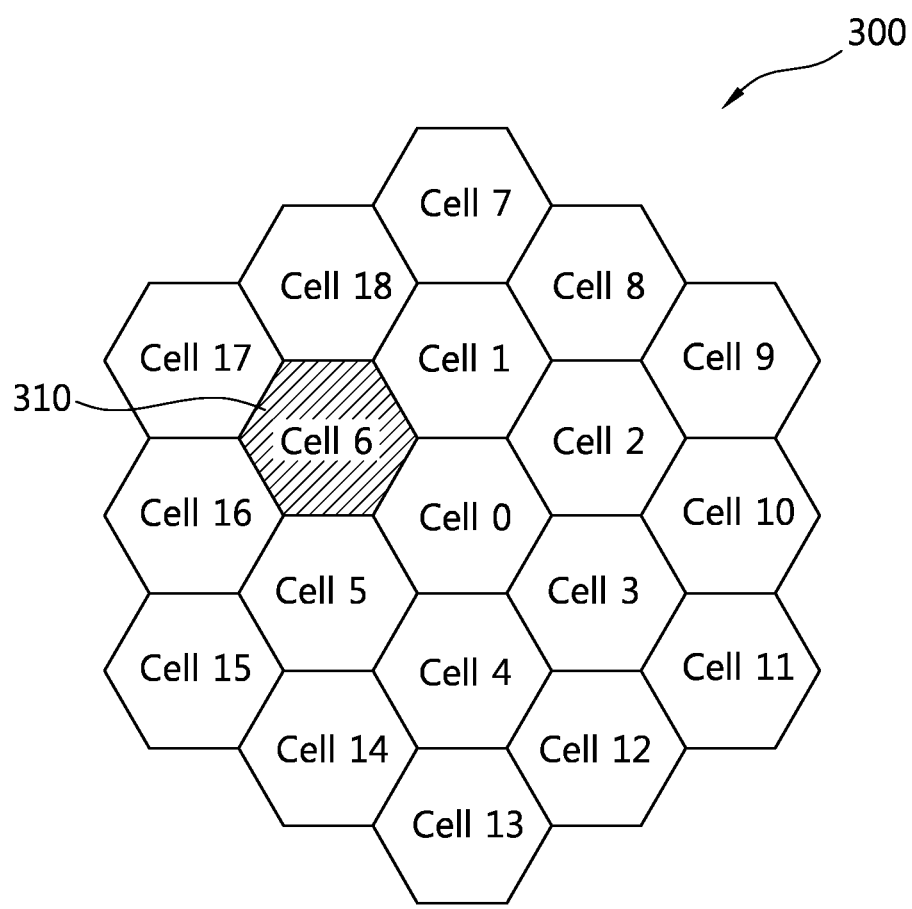
FIG. 12 shows an example of an MBSFN zone configured by the proposed MBS data transmission method.

Meanwhile, since the sub-zone data shares available transmission power in a cell, an amount of resources allocated to the sub-zone data needs to be determined in a range having a minimum effect on the MBS data. According to the amount of the resource allocated to the sub-zone data, a magnitude of transmission power allocated to the sub-zone can be determined In addition, a ratio of the magnitude of transmission power allocated to the MBS data and the magnitude of transmission power allocated to the sub-zone data may be predetermined FIG. 12 shows an example of an MBSFN zone configured by the proposed MBS data transmission method. In this case, a sub-zone consists of one cell. Referring to FIG. 12, 19 cells (i.e., cells 0 to 18) constitute an MBSFN zone 300. MBS data is transmitted in the MBSFN zone 300. The cell 6 constitutes a sub-zone 310. In the sub-zone 310, the MBS data and the sub-zone data are superposed to transmit superposition data.

Figure 13:
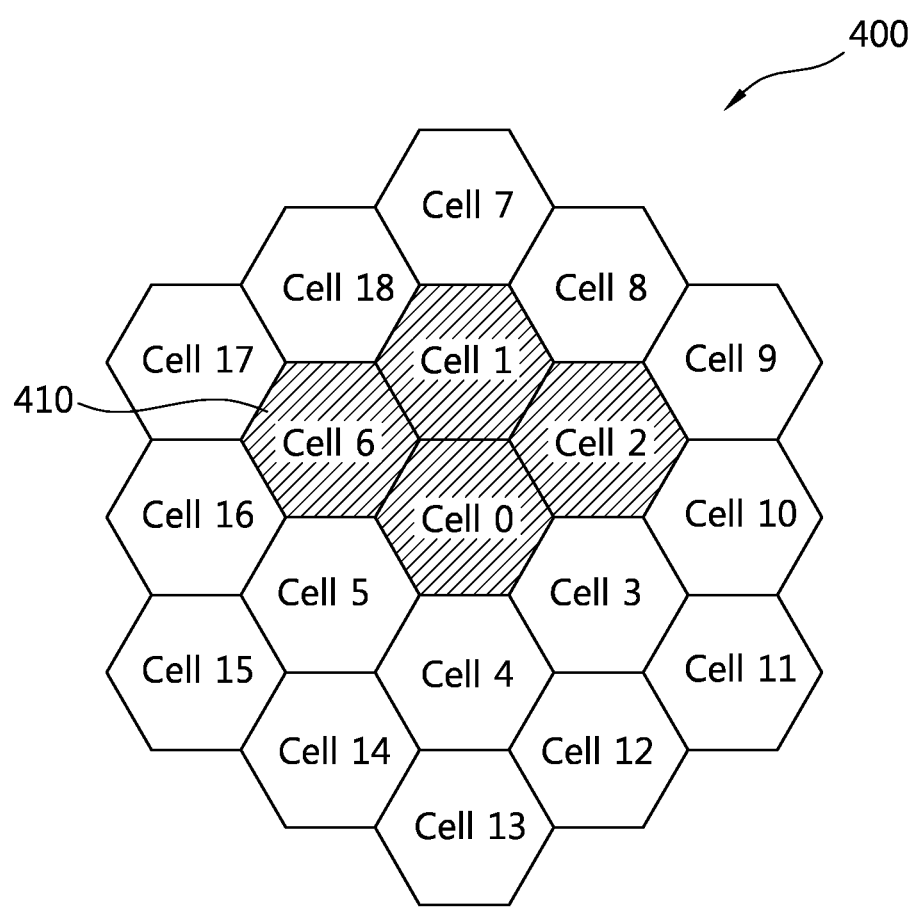
FIG. 13 shows another example of an MBSFN zone configured by the proposed MBS data transmission method.

FIG. 13 shows another example of an MBSFN zone configured by the proposed MBS data transmission method. In this case, a sub-zone consists of a plurality of cells.

Referring to FIG. 13, 19 cells (i.e., cells 0 to 18) constitute an MBSFN zone 400. MBS data is transmitted in the MBSFN zone 400. Four cells (i.e., the cells 0 to 2 and the cell 6) constitute a sub-zone 410. In the sub-zone 410, the MBS data and the sub-zone data are superposed to transmit superposition data.

Figure 14:
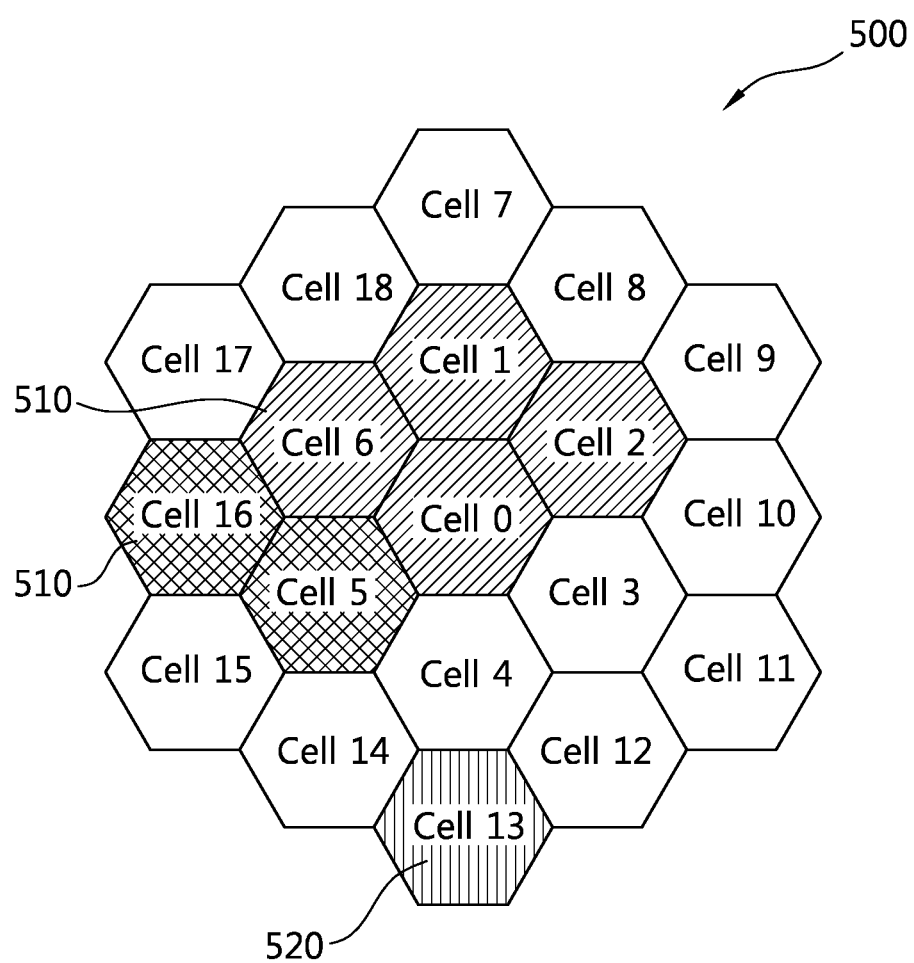
FIG. 14 shows another example of an MBSFN zone configured by the proposed MBS data transmission method.

FIG. 14 shows another example of an MBSFN zone configured by the proposed MBS data transmission method. In this case, a plurality of sub-zones exist in an MBSFN zone. Referring to FIG. 14, 19 cells (i.e., cells 0 to 18) constitute an MBSFN zone 500. MBS data is transmitted in the cells 0 to 19. Four cells (i.e., the cells 0 to 2 and the cell 6) constitute a first sub-zone 510. The cell 13 constitutes a second sub-zone 520. The cells 5, 15, and 16 constitute a third sub-zone 530. In the first sub-zone 510, the MBS data and the first sub-zone data are superposed to transmit first superposition data. In the second sub-zone 520, the MBS data and the second sub-zone data are superposed to transmit second superposition data. In the third sub-zone 530, the MBS data and the third sub-zone data are superposed to transmit third superposition data.

The MBS data and the sub-zone data may be identified by using different code sets. For example, the MBS data transmitted in the MBSFN zone 500 in the example of FIG. 14 may be multiplied by a first code set. The first sub-zone data of the first sub-zone 510 may be multiplied by a second code set. Likewise, the second sub-zone data of the second sub-zone 520 and the third sub-zone data of the third sub-zone 530 may be respectively multiplied by a third code set and a fourth code set. Cells in one sub-zone use the same code set. Various code sets may be used such as a PN code, an orthogonal code, etc. A code with excellent capability may be used to identity different data. Accordingly, UEs in the MBSFN zone can receive different data for each sub-zone while receiving the same MBS data.

Figure 15:
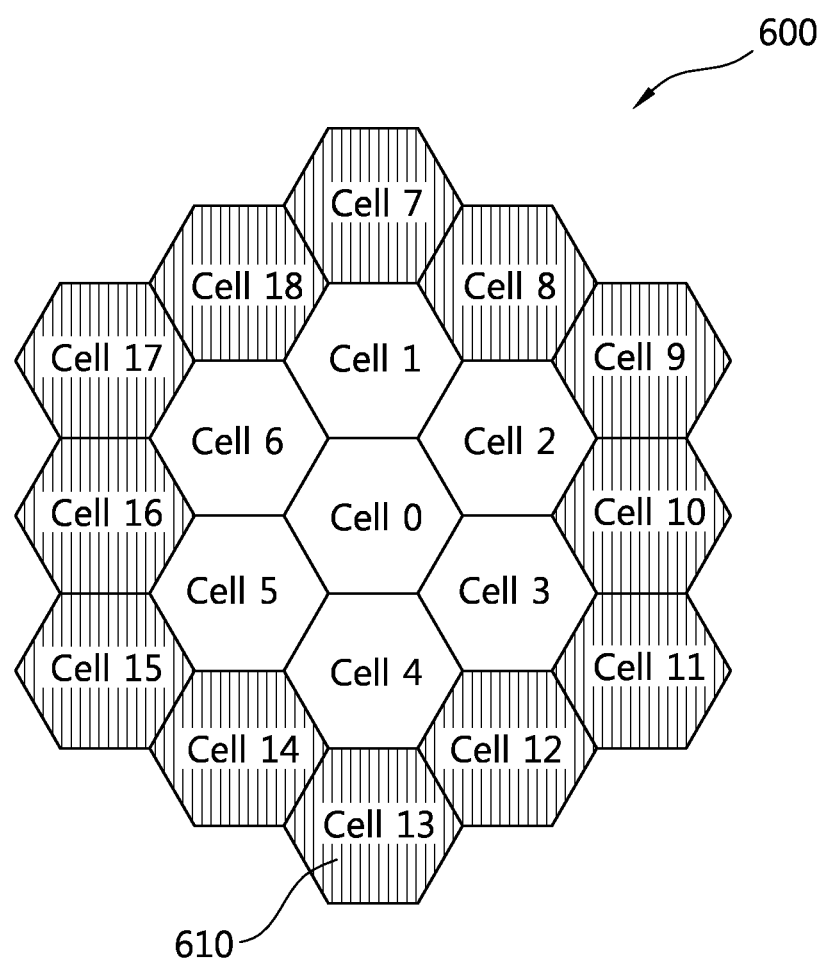
FIG. 15 shows another example of an MBSFN zone configured by the proposed MBS data transmission method.

FIG. 15 shows another example of an MBSFN zone configured by the proposed MBS data transmission method. In this case, a sub-zone is configured only with an edge cell in the MBSFN zone. Referring to FIG. 15, 19 cells (i.e., cells 0 to 18) constitute an MBSFN zone 600. MBS data is transmitted in the MBSFN zone 600. 12 cells (i.e., the cells 7 to 18) corresponding to edge cells of the MBSFN zone 600 constitute a sub-zone 610. In the sub-zone 610, the MBS data and the sub-zone data are superposed to transmit superposition data. In general, the UEs located in the cell edge may experience a cell edge problem in which a data reception rate is decreased and an MBSFN gain cannot be obtained. Therefore, as shown in the example of FIG. 15, the MBSFN gain can be obtained by configuring edge cells of the MBSFN zone as the sub-zone and by transmitting the MBS data one more time.

Meanwhile, even if several MBSFN zones exist, a sub-zone can be configured and superposition can be applied according to the proposed MBS data transmission method.

Figure 16:
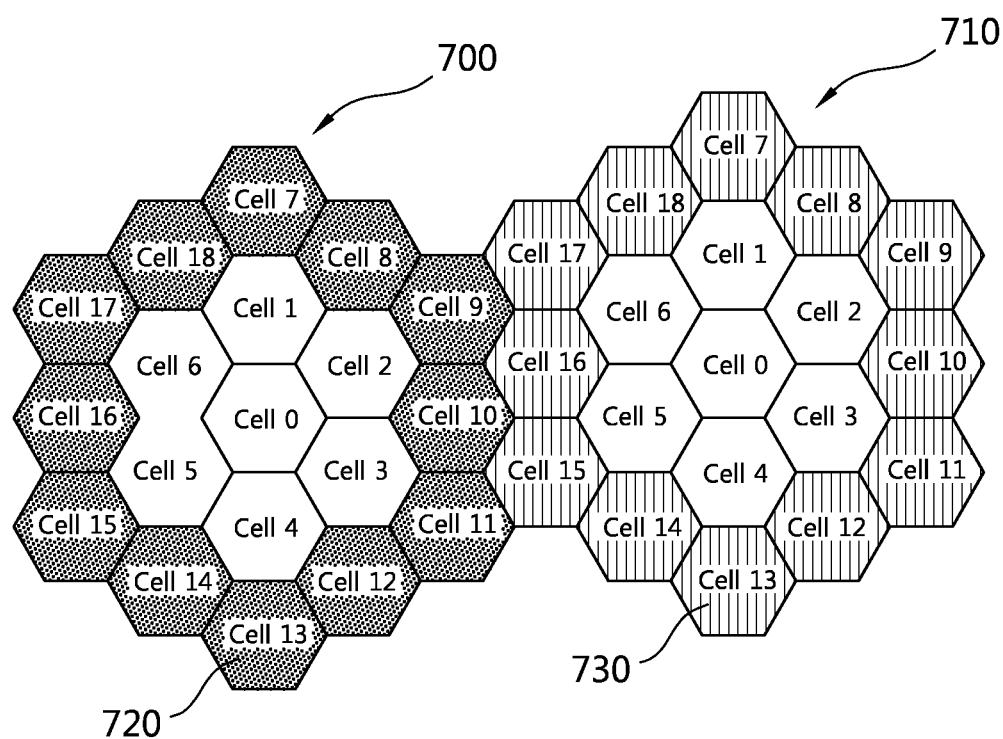
FIG. 16 shows an example of two cases of MBSFN zone deployment.

FIG. 16 shows an example of two cases of MBSFN zone deployment. Referring to FIG. 16, a first MBSFN zone 700 and a second MBSFN zone 710 are deployed consecutively. 12 cells (i.e., cells 7 to 18) of the first MBSFN zone 700 constitute a first sub-zone 720. 12 cells (i.e., cells 7 to 18) of the second MBSFN zone 710 constitute a first sub-zone 730. In this case, the cells 9 to 11 of the first MBSFN zone 700 and the cells 15 to 17 of the second MBSFN zone 710 are consecutive to each other. Accordingly, it is difficult for the cells 9 to 11 of the first MBSFN zone 700 and the cells 15 to 17 of the second MBSFN zone 710 to obtain a macro-diversity gain. In addition, since these cells experience interference from an adjacent MBSFN zone, an MBS data reception capability deteriorates in comparison with a cell center.

Figure 17:
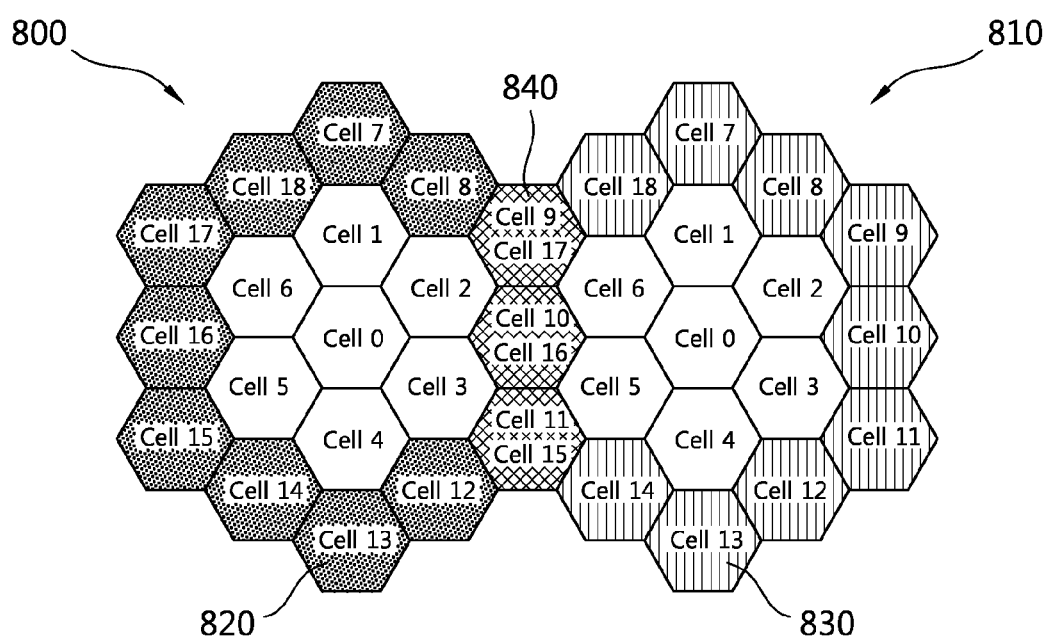
FIG. 17 shows another example of an MBSFN zone configured by the proposed MBS data transmission method.

FIG. 17 shows another example of an MBSFN zone configured by the proposed MBS data transmission method. In this case, when a plurality of MBSFN zones exist, edge cells in one MBSFN zone are shared with an adjacent MBSFN zone, and the edge cells are configured as a sub-zone.

Referring to FIG. 17, a first MBSFN zone 800 and a second MBSFN zone 810 are consecutively deployed in an overlapping manner. 9 cells (i.e., cells 7 and 8 and cell 12 to 18) of the first MBSFN zone 800 constitute a first sub-zone 820. 9 cells (i.e., cells 7 to 14 and a cell 18) of the second MBSFN zone 710 constitute a first sub-zone 830. In addition, the cells 9, 10, and 11 of the first MBSFN zone 800 overlap with the cells 17, 16, and 15 of the second MBSFN zone 810, and the three overlapping cells constitute a overlap sub-zone 840. In the first sub-zone 820, first MBS data which is MBS data of the first MBSFN zone 820 and the first sub-zone data are superposed to create first superposition data, and thus the first superposition data is transmitted. In the second sub-zone 830, second data which is MBS data of the second MBSFN zone 830 and the second sub-zone data are superposed to create second superposition data, and thus the second overlapping data is transmitted. In the overlap sub-zone 840, the first MBS data and the second MBS data are superposed to create third superposition data, and thus the third superposition data is transmitted. Accordingly, performance can be improved in a cell of the overlap sub-zone.

Meanwhile, the first and second MBS data transmitted in the cell belonging to the overlap sub-zone 840 may be multiplied by a code set for identifying the overlap sub-zone. For example, in the first sub-zone 820, the first MBS data or the first sub-zone data may be multiplied by a code set for identifying the first MBSFN zone. In the overlap sub-zone 840, in addition to multiplying the first MBS data or the second MBS data by the code set for identifying the first MBSFN zone or the second MBSFN zone, a code set for identifying the overlap sub-zone may be additionally multiplied. Accordingly, the first MBS data and the second MBS data which are superposed in the overlap sub-zone 840 can be identified. Various code sets may be used such as a PN code, an orthogonal code, etc. A code with excellent capability may be used to identity different data. Alternatively, different pilot patterns may be used to identify the first MBS data and the second MBS data.

Although it is described in FIG. 17 that two MBSFN zones exist and one overlap sub-zone is configured, this is for exemplary purposes only, and thus another MBSFN zone may exist in other regions. Accordingly, two or more overlap sub-zones may exist, and the example of FIG. 17 may be applied in a broader sense. However, the number of code sets for identifying a plurality of overlap sub-zones needs to be sufficiently great.

Figure 18:
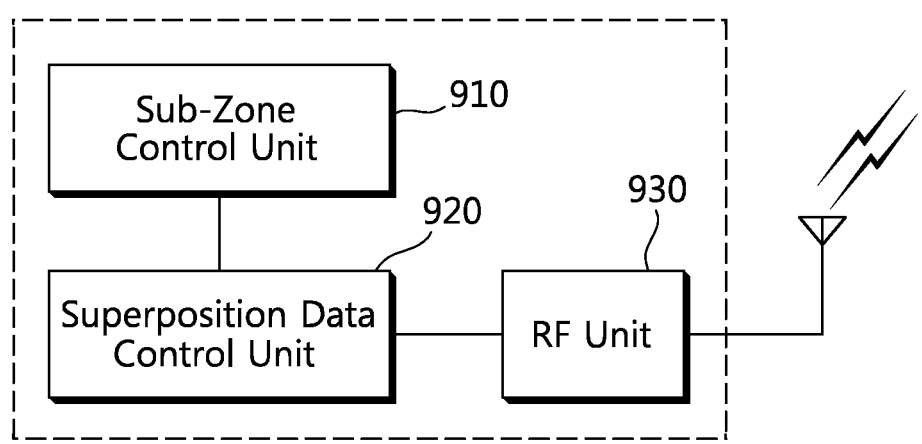
FIG. 18 is a block diagram showing an apparatus for implementing an embodiment of the present invention.

FIG. 18 is a block diagram showing an apparatus for implementing an embodiment of the present invention.

An apparatus 900 includes a sub-zone control unit 910, a superposition data control unit 920, and a radio frequency (RF) unit 930. The sub-zone control unit 910 and the superposition data control unit 920 implement the proposed functions, procedures, and/or methods.

The sub-zone control unit 910 divides an MBSFN zone including a plurality of cells into at least one sub-zone including at least one cell. The superposition data control unit 920 is coupled to the sub-zone control unit 910. The superposition data control unit 920 transmits MBS data, and transmits sub-zone data superposed with the MBS data. The RF unit 930 is coupled to the superposition data control unit 920, and transmits and/or receives a radio signal.

The sub-zone control unit 910 and the superposition data control unit 920 may include an application-specific integrated circuit (ASIC), a separate chipset, a logic circuit, and/or a data processing unit. The RF unit 930 may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the sub-zone control unit 910 and the superposition data control unit 920.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

The aforementioned embodiments include various exemplary aspects. Although all possible combinations for representing the various aspects cannot be described, it will be understood by those skilled in the art that other combinations are also possible. Therefore, all replacements, modifications, and changes should fall within the spirit and scope of the claims of the present invention.

What is claimed is:

1. A data transmission method in a wireless communication system, the method comprising:

dividing, by at least one base station, a multicast broadcast single frequency network MBSFN zone including a plurality of cells into at least one sub-zone including at least one cell, wherein the at least one sub-zone is configured only with all edge cells of the plurality of cells included in the MBSFN zone;

transmitting first multicast broadcast service (MBS) data through the plurality of cells belonging to the MBSFN zone; and transmitting second MBS data through the all edge cells belonging to the at least one sub-zone transmitted, wherein the second MBS data is retransmission data of the first MBS data only if the at least one sub-zone is configured with all edge cells in the MBSFN zone.

2. The data transmission method of claim 1, wherein the first MBS data and the second MBS data are transmitted by multiplying different code sets.

* * * * *